United States Patent
You

(10) Patent No.: US 10,072,782 B2
(45) Date of Patent: Sep. 11, 2018

(54) HOOP AS WELL AS MANUFACTURING METHOD AND USE METHOD OF HOOP

(71) Applicant: Yueqing Dongbo Electromechanical Co., Ltd., Wenzhou (CN)

(72) Inventor: Yixian You, Wenzhou (CN)

(*) Notice: Subject to any disclaimer, the term of this patent is extended or adjusted under 35 U.S.C. 154(b) by 287 days.

(21) Appl. No.: 15/154,942

(22) Filed: May 14, 2016

(65) Prior Publication Data
US 2017/0184235 A1 Jun. 29, 2017

(30) Foreign Application Priority Data

Dec. 24, 2015 (CN) .......................... 2015 1 0990443

(51) Int. Cl.
*F16L 33/02* (2006.01)
*F16L 33/025* (2006.01)

(52) U.S. Cl.
CPC .................................. *F16L 33/025* (2013.01)

(58) Field of Classification Search
CPC ........................ F16L 33/025; Y10T 24/1478; Y10T 24/1427; Y10T 24/1429; Y10T 24/1431; Y10T 24/1433; Y10T 24/1441; Y10T 24/1443
See application file for complete search history.

(56) References Cited

U.S. PATENT DOCUMENTS

| 3,286,314 A * | 11/1966 | Oetiker | B21D 39/03 |
| | | | 24/20 CW |
| 2010/0101057 A1* | 4/2010 | Danby | B60R 21/217 |
| | | | 24/16 R |

FOREIGN PATENT DOCUMENTS

| CN | 2611717 Y | 4/2004 |
| CN | 1509388 A | 6/2004 |
| CN | 204829049 U | 12/2015 |
| CN | 205278633 U | 6/2016 |
| GB | 2253451 B | 9/1992 |
| JP | 09213418 A | 8/1997 |

OTHER PUBLICATIONS

First Office Action of CN201510990443.4.
Search report of CN201510990443.4.

* cited by examiner

*Primary Examiner* — Robert Sandy
(74) *Attorney, Agent, or Firm* — Wayne & Ken, LLC; Tony Hom

(57) ABSTRACT

Disclosed is a hoop and a manufacturing method and a use method of the hoop. The hoop includes a clamping belt, the clamping belt is bent to form a hoop body with a sleeving area; the hoop body forms a superposed part; the superposed part includes an outer belt body and an inner belt body and the sleeving area is elliptical. The manufacturing method thereof includes the steps of producing a clamping belt at first, and then directly bending the clamping belt to form a hoop body with an elliptical sleeving area.

6 Claims, 7 Drawing Sheets

HOOP AS WELL AS MANUFACTURING METHOD AND USE METHOD OF HOOP

CROSS-REFERENCE TO RELATED APPLICATIONS

This application claims the priority benefit of a Chinese patent application No. 201510990443.4, filed on Dec. 24, 2015. The content of the aforementioned application, including any intervening amendments thereto, is incorporated herein by reference.

TECHNICAL FIELD

The present invention relates to a clamping element, and more specifically relates to a hoop.

BACKGROUND

A fastener on a pipe fitting, e.g., a hoop, also called as a lug clip and provided with a circular inner ring, is widely applied to life. At present, a Chinese patent with an application number of CN201380025000.0 discloses a lug clip; and the lug clip is provided with a clamping belt in which a lug-shaped fastening part is formed, and two legs extending outwards and mutually connected through a rib plate.

Because the inner diameter of the lug clip is greater than the outer diameter of a pipe fitting, the lug clip is quite liable to loose in case of being sleeved on the pipe fitting, however, if the inner diameter of the lug clip is directly reduced to be equal to the outer diameter of the pipe fitting, surface-surface friction will be formed between the pipe fitting and the lug clip, and operating personnel will inconveniently sleeve the lug clip on the pipe fitting. In addition, during installation, the lug clip is moved to an expected position on the pipe fitting, the lug clip needs to be located by one hand, and the fastening part needs to be further deformed by the other hand with a lug clip clamping tool to fasten the lug clip until an expected clamping pressure is achieved.

With regard to the lug clip, a hoop body with a normal-specification hoop inner diameter needs to be produced in advance, and the fastening part is pre-deformed in a production state to reduce the inner diameter of the lug clip and enable the inner diameter of the lug clip to be more approximate to the outer diameter of the pipe fitting but not equal to the outer diameter of the pipe fitting, so as to realize that an anti-loosing effect is achieved when the lug clip is pre-fixed to the pipe fitting, so that the lug clip is assembled on the pipe fitting with basically no clearance, and then secondary clamping needs to be carried out on the fastening part when the hoop body arriving at the expected position is finally fixed, so that secondary shrinking is carried out on the whole hoop body, and the hoop body is completely locked with the pipe fitting while achieving a limit degree. Therefore, secondary clamping and shrinking treatment is carried out on the fastening part, and is time-wasting and labor-wasting, thus the overall production efficiency will be greatly reduced and production cost will be increased. Moreover, different operation table surfaces are needed for carrying out secondary clamping on the fastening part, thus the accuracy is greatly reduced. What's more, because the fastening part is sequentially subjected to secondary deformation, it is difficult to control an applying force, thus the risk of breakage of the lug clip is greatly increased, and then the instability of installation and fastening for the lug clip is caused.

Another Chinese patent with an application number of CN201520555541.0 discloses an anti-loosing hoop for a pipe fitting. The anti-loosing hoop comprises a clamping belt 1, wherein the clamping belt 1 is bent to be circular and provided with a superposed part 11; the superposed part 11 comprises an outer part and an inner part; and through clamping connection and pre-fixing between upper hook-shaped parts of the inner part and upper damping grooves of the outer part, and clamping for side legs, that is, clamping lugs, arranged on the outer part, the anti-loosing hoop is deformed to be tightened up as a whole, thus the inner diameter and the outer diameter are reduced.

At this moment, a relative action force between the hook-shaped parts and the clamping grooves is increased. Because it is difficult to control a clamping force on the clamping lugs, specifically, as shown in FIG. 5, a stroke from a second clamping connection element 42 to a second locking resisting side 521 is equal to a stroke from a first clamping connection element 41 to a first locking resisting side 511; and because the first locking side 511 is closer to a fastening part 122 relative to the second locking side 521 when the fastening part 122 is clamped, the first locking side 511 is stressed at first, and is more liable to break, thus the whole lug clip is liable to break, and then the whole hoop is broken to fail, and unnecessary waste is caused.

SUMMARY

With regard to shortages existing in the prior art, the present invention aims at providing a hoop as well as a manufacturing method and a use method of the hoop. The hoop has the advantages of being convenient in installation and capable of being effectively pre-fixed to a pipe fitting.

In order to realize the above purpose, the present invention provides the following technical solution: A hoop comprises a clamping belt, wherein the clamping belt is bent to form a hoop body with a sleeving area; the hoop body forms a superposed part; the superposed part comprises an outer belt body and an inner belt body; and the sleeving area is elliptical.

Through the above technical solution, the hoop body is sleeved on a pipe fitting, and the pipe fitting is inserted from the sleeving area; the elliptical sleeving area is capable of quite effectively performing an anti-loosing effect, and an elliptical short axis forms line contact with the surface of the pipe fitting in advance to prevent the occurrence of the case of loosing when the hoop is pre-fixed to the pipe fitting; and meanwhile, operating personnel can also much easily sleeve the hoop on the sleeved pipe fitting, and the operating personnel can, by virtue of the characteristic of the elliptical shape, much easily hold and operate with a knob by an arc surface formed by a long axis and the short axis, and it is easier for the hoop to arrive at and be fixed at an expected position through rotary propulsion.

The hoop provided by the present invention is further configured as: clamping connection notches are arranged in any one of the outer belt body and the inner belt body, and clamping elements are correspondingly arranged on the other belt body.

Through the above technical solution, the outer belt body and the inner belt body can be mutually locked.

The hoop provided by the present invention is further configured as: each clamping connection notch comprises a first damping connection port and a second clamping connection port, each clamping connection element comprises a first clamping connection element and a second clamping connection element, the first clamping connection port comprises a first locking resisting side, and the second clamping connection port comprises a second locking resisting side; and when the clamping connection elements penetrate in the clamping connection notches to form locking, a stroke from the first clamping connection element to the first locking resisting side is greater than a stroke from the second clamping connection element to the second locking resisting side.

Through the above technical solution, when the hoop body is not clamped and fixed to the pipe fitting, a certain movement range is reserved respectively between the first clamping connection element and the first locking resisting side, and between the second clamping connection element and the second locking resisting side, for preventing cracking of the outer belt body due to instantaneous locking when the hoop body is clamped and shrunk; because the first locking resisting side is closer to the fastening part relative to the second locking resisting side, when the fastening part is shrunk and clamped, the first clamping connection element will contact with the first locking resisting side at first; therefore, due to the setting that the stroke from the first clamping connection element to the first locking resisting side is greater than the stroke from the second clamping connection element to the second locking resisting side, the second locking resisting side is stressed by the first locking resisting side at first, and when the second locking resisting side is about to achieve a limit bearing force, the first clamping connection element is abutted against the first locking resisting side, the first locking resisting side starts to be stressed, and decomposes and bears a force stressed by the second locking resisting side; therefore, when the hoop body is locked, a time difference of the two locking resisting sides in stress time is caused due to the difference of the strokes between the two clamping elements and the corresponding locking resisting sides, and a buffering effect is performed on the cracking of the outer belt body due to a locking force; in this way, cracking of the first locking resisting side on the outer belt body due to instantaneous locking when the hoop body is clamped and shrunk; can be effectively prevented. At least two pairs of clamping connection notches and clamping elements are arranged, so that the strength and the stability of the hoop provided by the present invention can be greatly improved, and secondary protection is equivalently achieved.

The hoop provided by the present invention is further configured as: the sleeving area comprises a long axis and a short axis, the outer belt body is provided with a fastening part vertically to the direction of the short axis in the sleeving area, and the short axis is superposed with the central line of the fastening part.

Through the above technical solution because the short axis is superposed with the central line of the fastening part, when the whole hoop body is locked through the fastening part, the outer belt body and the inner belt body are both capable of being uniformly stressed towards the short s haft, and shrunk and locked by taking the central line of the fastening part as a symmetrical line, and the occurrence of the case of breakage of the hoop body due to non-uniform local stresses is avoided.

The hoop provided by the present invention is further configured as: the length range of the long axis of the hoop body is 17.2 mm+/−0.25 mm, and the length range of the short axis of the hoop body is 15.7 mm+/−0.25 mm.

Through the above technical solution, generally speaking, the diameter of the pipe fitting is usually 15.8 mm, and therefore, the range is an optimal implementation range.

The hoop provided by the present invention is further configured as: the difference range of the stroke from the first damping connection element to the first locking resisting side, and the stroke from the second clamping connection element to the second locking resisting side is 0.3 mm-0.6 mm.

Through the above technical solution, practice has proven that, breakage of a part between the fastening part and each damping connection notch can be effectively prevented, and therefore, the range is the optimal gap difference range.

A manufacturing method of a hoop comprises the steps of producing a clamping belt at first, and then directly bending the clamping belt to form a hoop body with an elliptical sleeving area. The hoop provided by the present invention is further configured as: the fastening part is clamped and shrunk in advance, so that the short axis in the sleeving area, and the pipe fitting have an equal outer diameter.

A use method of a hoop comprises the above hoop, and also comprises the following specific steps: directly bending a clamping belt to form a hoop body with a sleeving area; carrying out pre-forming treatment on the sleeving area to enable the sleeving area to be elliptical and enable the short axis in the sleeving area and the pipe fitting to have an equal outer diameter; sleeving the hoop body on the pipe fitting to enable the hoop body to form abutting connection with the pipe fitting at a short axis corresponding to the sleeving area; and further shrinking and clamping the hoop through a hoop clamping tool.

With the ad option of the above technical solution, operating personnel enable the sleeving area to be in contact fit with the pipe fitting through mutual matching of the two methods of pre-clamping the fastening part or enabling the sleeving area to become elliptical, thus when the hoop body is sleeved on the pipe fitting, the hoop body is not liable to loose in case of being not finally fastened, and an anti-loosing effect can be quite effectively performed. Because an arc surface pointed by the elliptical short axis is abutted against the surface of the pipe fitting in advance, the occurrence of the case of loosing when the hoop is pre-fixed to the pipe fitting is prevented. Meanwhile, the operating personnel can also much easily sleeve the hoop on the sleeved pipe fitting, the operating personnel can, by virtue of the characteristic of the elliptical shape, much easily hold and operate with a knob by an arc surface formed by a long axis and the short axis, and it is easier for the hoop to arrive at and be fixed at an expected position through rotary propulsion.

By bending the clamping belt to directly form an elliptical shape, steps can be simplified, production flow can be accelerated, and the anti-loosing effect can be quite effectively performed.

In conclusion, the present invention has the following beneficial effects:

1. A certain movement range is reserved respectively between the first damping connection element and the first locking resisting side, and between the second clamping connection element and the second locking resisting side, for preventing cracking of the outer belt body due to instantaneous locking when the hoop body is clamped and shrunk; due to the setting that the stroke from the first clamping connection element to the first locking resisting side is greater than the stroke from the second clamping connection element to the second locking resisting side, the second locking resisting side is stressed by the first locking resisting side at first, and when the second locking resisting side is about to achieve a limit bearing force, the first clamping connection element is abutted against the first locking resisting side, the first locking resisting side starts to be stressed, and decomposes and bears a force stressed is locked, a time difference of the two locking resisting sides in stress time is caused due to the difference of the strokes between the two clamping elements and the corresponding locking resisting sides, and a buffering effect is performed on the cracking of the outer belt body due to a locking force; in this way, cracking of the first locking resisting side on the outer belt body due to instantaneous locking when the hoop body is clamped and shrunk can be effectively prevented.

2. In the case that the stroke from the second clamping connection element to the second locking resisting side is equal to the stroke from the first clamping connection element to the first locking resisting side, the movement tendency of the first clamping connection port in the hoop body with an elliptical sleeving area is more gentle compared with the movement tendency of the first clamping connection port in the hoop body with a circular sleeving area, and therefore, the hoop body is more not liable to crack while being shrunk.

3. By directly bending the clamping belt to pre-form an elliptical shape, a pre-deforming treatment operation on the fastening part can be effectively replaced, an anti-loosing effect during pre-fixing on the pipe fitting can also be achieved, and the fastening part can be prevented from many times of deformation, thus the stability and the firmness of the hoop body during clamping fastening are effectively improved and the occurrence of a usual case of breakage during clamping is avoided. In addition, the operation step of pre-clamping deforming treatment on the fastening part is also omitted. In this way, production and processing flow is optimized, production efficiency is greatly increased, and production cost is also reduced. The operating personnel can, by virtue of the characteristic of the elliptical shape, much easily hold and operate with a knob by an arc surface formed by a long axis and the short axis, and it is easier for the hoop to arrive at and be fixed at an expected position through rotary propulsion.

Description of the drawings: 1. clamping belt; 10. hoop body; 101. sleeving area; 11. superposed part; 12. outer belt body; 122. fastening part; 13. inner belt body; 2. long axis; 3, short axis; 4. clamping element; 41. first clamping connection element; 42. second clamping connection element; 5. clamping connection notch; 51. first clamping connection port; 511. first locking resisting side; 52, second clamping connection port; and 521, second locking resisting side.

DETAILED DESCRIPTION

The present invention is further described in details below in conjunction with the accompanying drawings through specific embodiments, and the embodiments below are merely descriptive and do not define the protection scope of the present invention.

Figure 1:
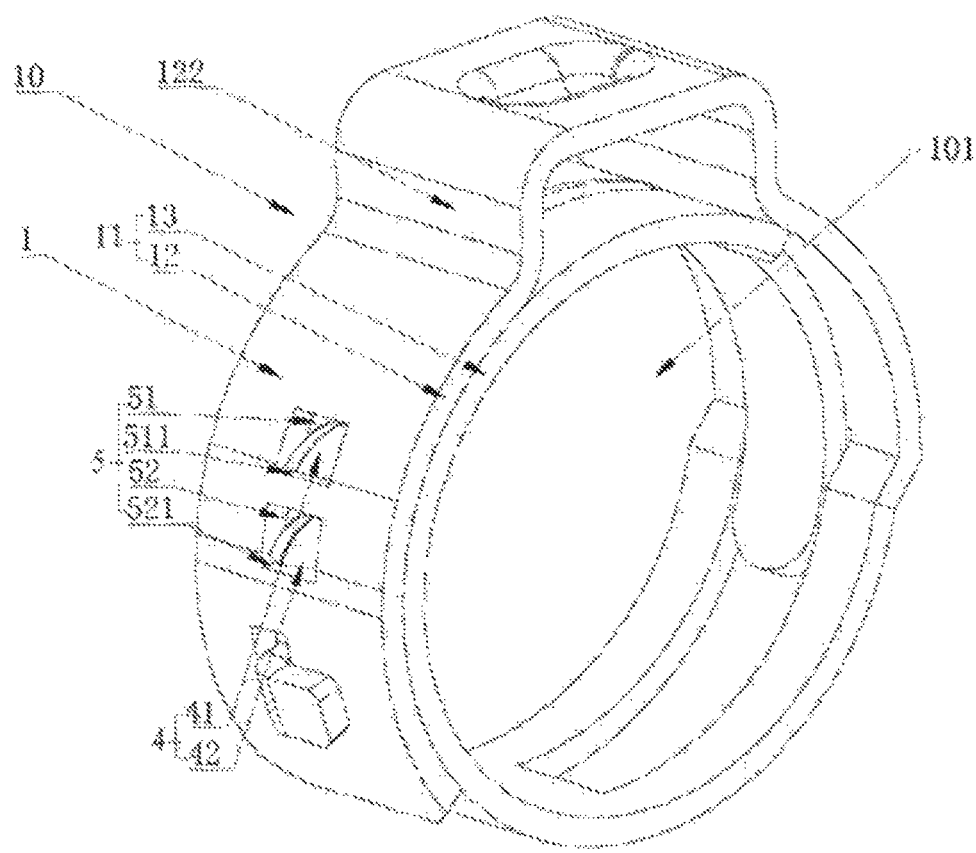
FIG. 1 is a structural schematic diagram of an embodiment of a hoop of the present invention.
Figure 4:
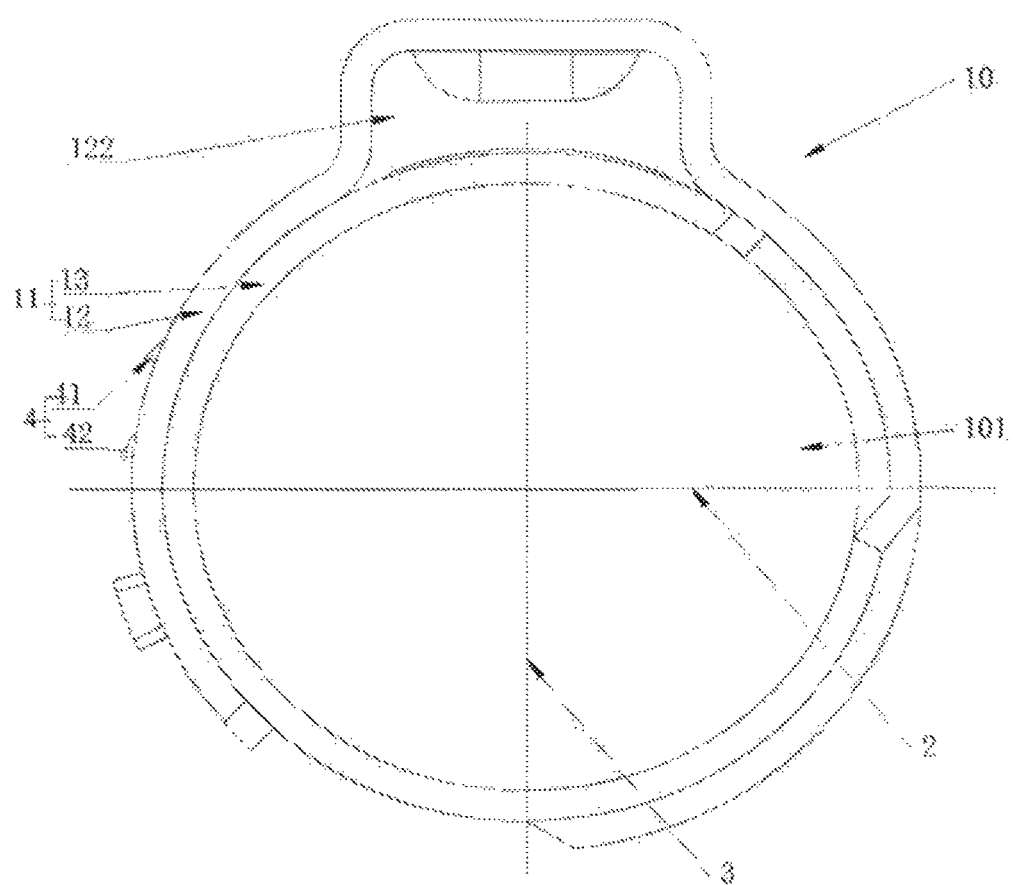
FIG. 4 is a front view of a hoop of the present invention.
Figure 5:
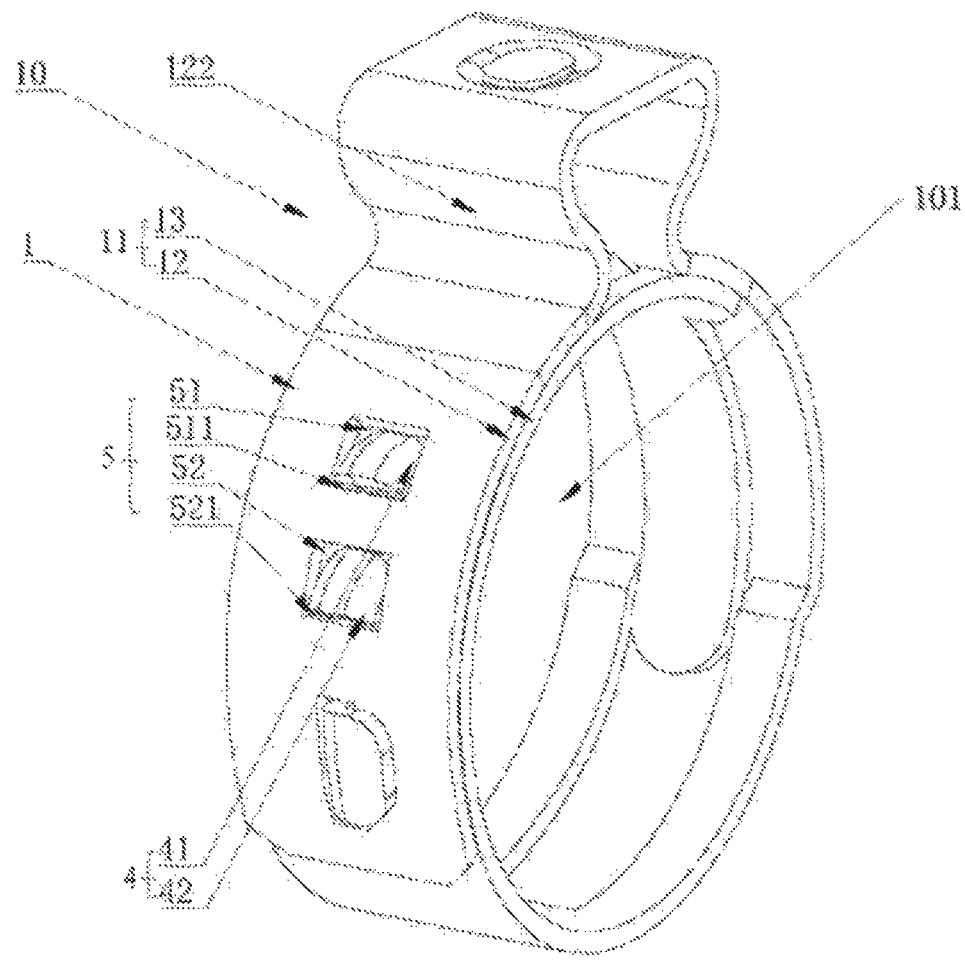
FIG. 5 is a traditional hoop.

As shown in FIG. 1 to FIG. 4, a specific embodiment of a hoop product is as follows:

As shown in FIG. 1 and FIG. 4, a hoop comprises a clamping belt 1, wherein the clamping belt 1 is bent to form a hoop body 10 with a sleeving area 101. The hoop body 10 is sleeved on a pipe fitting, and the sleeving area 101 is used for inserting the pipe fitting. The hoop body 10 forms a superposed part 11, and the superposed part 11 comprises an outer belt body 12 and an inner belt body 13. The sleeving area 101 comprises a long axis 2 and a short axis 3, and the outer belt body 12 is provided with a fastening part 122.

Figure 2:
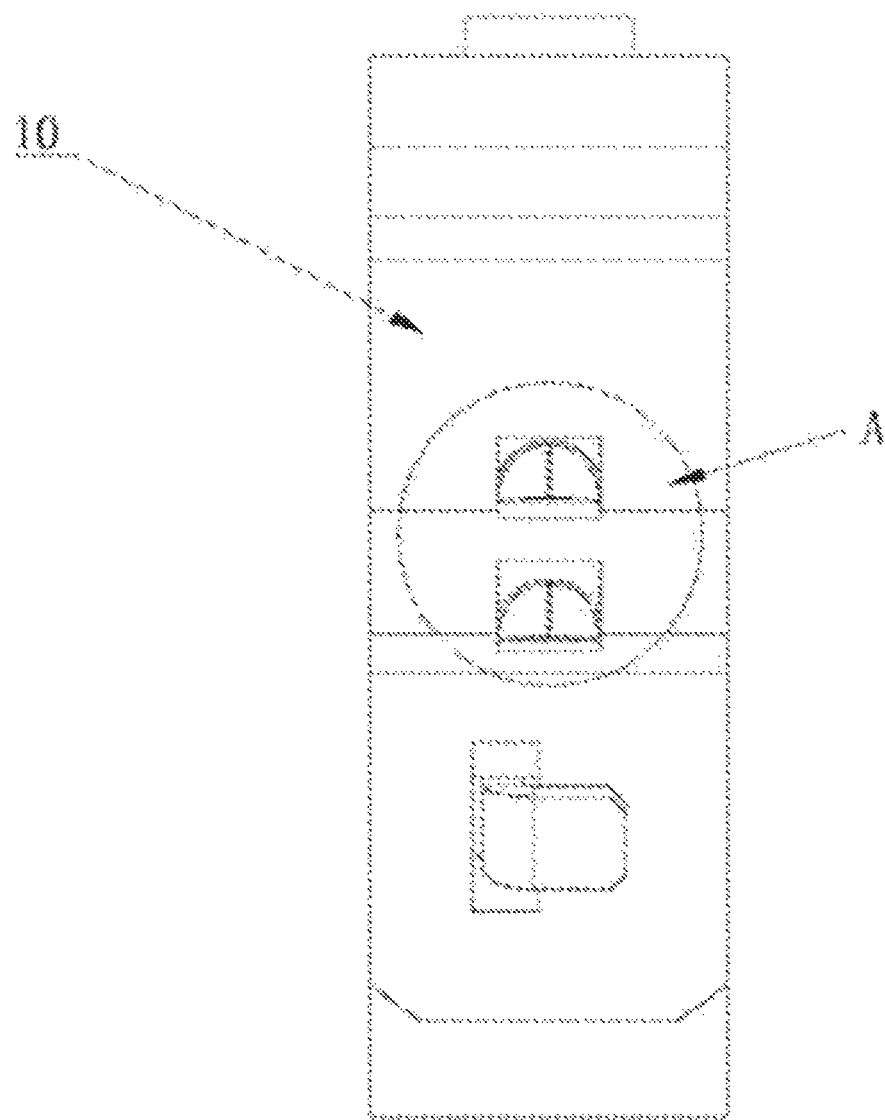
FIG. 2 is a side view of an embodiment of a hoop of the present invention.
Figure 3:
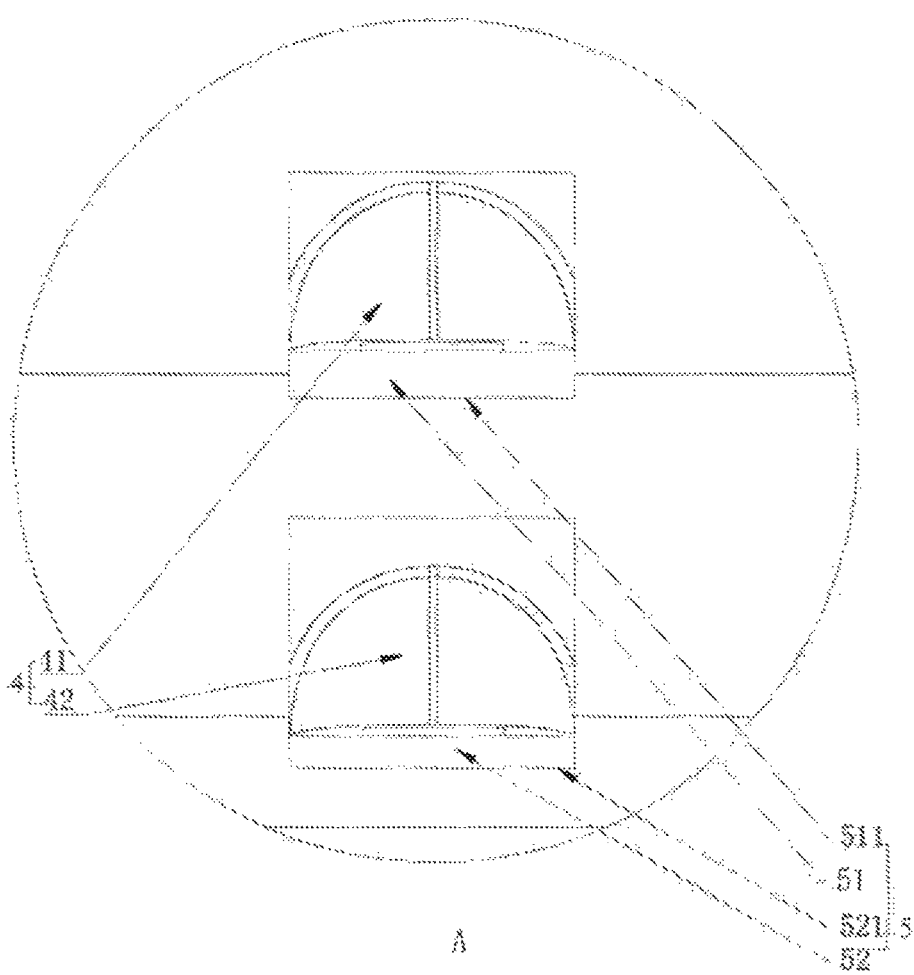
FIG. 3 is an enlarged view of part A.

As shown in FIG. 2 and FIG. 3, clamping connection notches 5 are arranged in the outer belt body 12 (it should be noted herein that, the clamping connection notches 5 can be configured as through holes or blind holes which can be simply, conveniently and rapidly formed in one process); the inner belt body 13 is provided with clamping elements 4 (it should be noted herein that, the clamping connection notches 5 may also be arranged in the inner belt body 13, and the clamping elements 4 are arranged on the outer belt body 12, however, it should be noted that when the clamping elements 4 are arranged on the outer belt body 12, the clamping connection notches 5 in the inner belt body 13 should be configured as the blind holes; in this way, the clamping elements 4 on the outer belt body 12 are prevented from penetrating through the clamping connection notches 5 in the inner belt body 13 to be directly abutted against the pipe fitting); each clamping connection notch 5 comprises a second clamping connection port 52 and a first clamping connection port 51; each clamping connection element 4 comprises a second clamping connection element 42 and a first clamping connection element 41; and the first damping connection element 41, the second clamping connection element 42, the fastening part 122, the first clamping connection port 51 and the second clamping connection port 52 are sequentially arranged on the clamping belt 1.

The second clamping connection element 42 and the first clamping connection element 41 correspond to the second damping connection port 52 and the first clamping connection port 51 respectively, the second clamping connection port 52 comprises a second locking resisting side 521, and the first clamping connection port 51 comprises a first locking resisting side 511. When the hoop body 10 and the pipe fitting need to be clamped the first clamping connection element 41 forms locking resisting connection with the first locking resisting side 511, and, the second clamping connection element 42 forms locking resisting connection with the second locking resisting side 521.

As shown in FIG. 1 and FIG. 4, the sleeving area 101 is elliptical. The length range of the long axis 2 of the hoop body 10 is 17.2 mm+/−0.25 mm, and the length range of the short axis 3 of the hoop body 10 is 15.7 mm+/−0.25 mm. Generally speaking, the diameter of the pipe fitting is usually 15.8 mm, and therefore, the range is an optimal implementation range.

The short axis 3 of the hoop body 10 is superposed with the central line of the fastening part 122. When the w hole hoop body 10 is locked through the fastening part 122, the outer belt body 12 and the inner belt body 13 are both capable of being uniformly stressed towards the short axis 3, and shrunk and locked by taking the central line of the fastening part 122 as a symmetrical line, and the occurrence of the case of breakage of the hoop body 10 due to non-uniform local stresses is avoided.

To prevent the occurrence of cracking of the hoop body, regardless of the shape of the sleeving area 101, the hoop body can also be configured as follows: the stroke from the first clamping connection element 41 to the first locking resisting side 511 is greater than the stroke from the second clamping connection element 42 to the second locking resisting side 521, and the difference range of two strokes is preferably 0.3 mm-0.6 mm.

When the hoop body 10 is not clamped and fixed to the pipe fitting, a certain movement range is reserved respectively between the first clamping connection element and the first locking resisting side, and between the second clamping connection element and the second locking resisting side, for preventing cracking of the outer belt body due to instantaneous locking when the hoop body is clamped and shrunk; because the first locking resisting side is closer to the fastening part relative to the second locking resisting side, when the fastening part is shrunk and damped, the first clamping connection element will contact with the first locking resisting side at first; therefore, due to the setting that the stroke from the first damping connection element to the first locking resisting side is greater than the stroke from the second clamping connection element to the second locking resisting side, the second locking resisting side is stressed by the first locking resisting side at first, and when the second locking resisting side is about to achieve a limit bearing force, the first clamping connection element is abutted against the first locking resisting side, the first locking resisting side starts to be stressed, and decomposes and bears a force stressed by the second locking resisting side; therefore, when the hoop body is locked, a time difference of the two locking resisting sides in stress time is caused due to the difference of the strokes between the two clamping elements and the corresponding locking resisting sides, and a buffering effect is performed on the cracking of the outer belt body due to a locking force; in this way, cracking of the first locking resisting side on the outer belt body due to instantaneous locking when the hoop body is clamped and shrunk can be effectively prevented.

However, it should be noted herein that, after many times of tests, the applicant finds that with regard to the hoop with the elliptical sleeving area 101, it would be best to set the stroke from the first clamping connection element 41 to the first locking resisting side 511 to be greater than the stroke from the second clamping connection element 42 to the second locking resisting side 521.

The positions of the two clamping elements and the two clamping grooves are arranged according to that the clamping belt is pre-formed to be provided with the elliptical sleeving area, after the traditional circular sleeving area 101 is pre-formed into the elliptical hoop body 10, the elliptical short axis 3 points to the fastening part 122, and the elliptical long axis 2 points to the second clamping connection port 52; if the stroke from the second clamping connection element 42 to the second locking resisting side 521 is still kept to be equal to the stroke from the first clamping connection element 41 to the first locking resisting side 511, because the hoop body 10 is extruded to generate deformation the stroke from the first clamping connection element 41 to the first locking resisting side 511 will be reduced, and the stroke from the second clamping connection element 42 to the second locking resisting side 521 will also be reduced, so that the first clamping connection port 51 and the second clamping connection port 52 will both early enter a stress phase; in addition, because the second clamping connection port 52 is closer to the arc surface where the outer belt body 12 pointed by the long axis 2 is located, compared with the first clamping connection port 51, the deformation degree of the arc surface where the second clamping connection port 52 is located is greater than the deformation degree of the arc surface where the first clamping connection port 51 is located; and therefore, the case of breakage of the outer belt body 12 between the fastening part 122 and the first clamping connection port 51, of the hoop body 10 with the elliptical sleeving area 101 is extremely easily caused.

Figure 6:
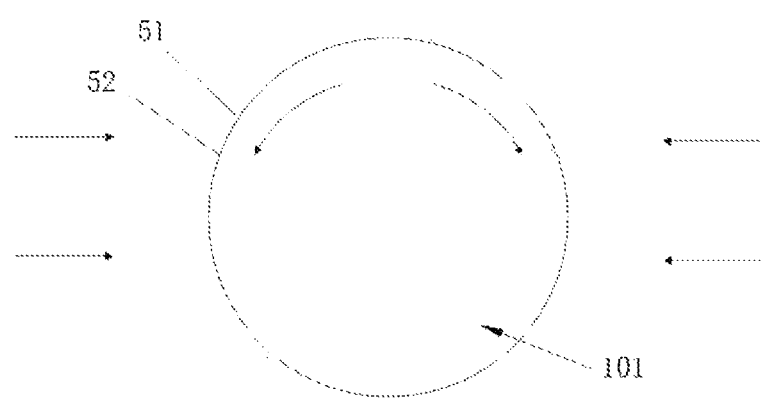
FIG. 6 is a schematic diagram of a hoop body with a circular sleeving area.
Figure 7:
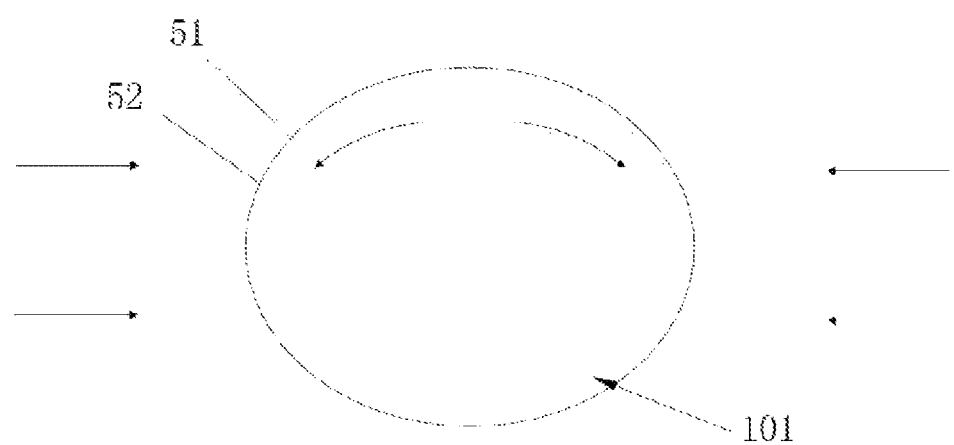
FIG. 7 is a schematic diagram of a hoop body with a circular sleeving area.

As shown in FIG. 6 and FIG. 7, FIG. 6 shows the hoop body 10 with the circular sleeving area 101; FIG. 7 shows the hoop body 10 with the elliptical sleeving area 101; and in the case that the stroke from the second clamping connection element 42 to the second locking resisting side 521 is equal to the stroke from the first clamping connection element 41 to the first locking resisting side 511, the movement tendency of the first clamping connection port 51 in FIG. 7 is more gentle compared with the movement tendency of the first clamping connection port 51 in FIG. 6, and therefore, the hoop body 10 is more not liable to crack while being shrunk.

Therefore, after the hoop body 10 is configured to be provided with the elliptical sleeving area 101, it would be best to set the stroke difference of the first clamping connection element 41 and the second clamping connection element 42, that is, the stroke from the second clamping connection element 42 to the second locking resisting side 521 is less than the stroke from the first clamping connection element 41 to the first locking resisting side 511.

Actually, a position with a movement distance is reserved for the first clamping connection element 41 on the first clamping connection port 51, wherein the movement distance is longer than that of a position reserved for the second clamping connection element 42 on the second clamping connection port 52, and a good effect of delayed stress is performed, so that the second clamping connection port 52, the second locking resisting side 521 and the second clamping connection element 42 are stressed at first, and the first clamping connection port 51, the first locking resisting side 511 and the first clamping connection element 41 are stressed again when a certain extent is achieved; in this way, a stress time difference is reasonably utilized, and the weak points of the clamping connection notches 5 in the outer belt body 12 are made up, thereby effectively preventing the breakage of the hoop.

With regard to a specific embodiment of a manufacturing method of a hoop:

The hoop can be directly pre-formed into a hoop body 10 with an elliptical sleeving area 101 for selling during production and manufacture; the hoop can also be manufactured to be in the form of a clamping belt 1 for selling, and then treated and formed into a hoop body 10 with an elliptical sleeving area 101 during use. In order to facilitate use of a user, operation steps can be simplified; and in the embodiment, preferably, the hoop is directly pre-formed into a hoop body 10 with an elliptical sleeving area 101 for selling during production and manufacture.

In addition, the fastening part 122 can be directly pre-clamped and shrunk during production, or be pre-clamped and shrunk before use, or be directly clamped and shrunk in one process during use. In order to facilitate installation of installation personnel and save time and labor during later shrinking working, in the embodiment, preferably, the fastening part 122 is directly pre-clamped and shrunk during production or pre-clamped and shrunk before use.

With regard to a specific embodiment of a use method of a hoop:

Firstly, a clamping belt is directly bent to form a hoop body 10 with a sleeving area 101; secondly, pre-forming treatment is carried out on the sleeving area 101 and the sleeving area 101 is enabled to be elliptical (the manner of pre-forming during production or the manner of pre-forming before use can be adopted, the sleeving area 101 is directly formed to be elliptical by adopting the former manner, thus steps can be simplified and production flow can be accelerated, so that more convenience is brought for a user; and the latter manner is higher in selectivity and more flexible in use); the hoop body 10 is sleeved on the pipe fitting to enable the hoop body 10 to form abutting connection with the pipe fitting at a short axis 3 corresponding to the sleeving area 101; and the hoop is further shrunk and clamped through a hoop clamping tool (the, manner of shrinking and clamping the whole hoop body 10, or the manner of shrinking and clamping the fastening part 122, or the manner of combining the two manners can be adopted).

In conclusion, by directly bending the clamping belt 1 to pre-form an elliptical shape, a pre-deforming treatment operation on the fastening part 122 can be effectively replaced, an anti-loosing effect during pre-fixing on the pipe fitting can also be achieved, and the fastening part 122 can be prevented from many times of deformation, thus the stability and the firmness of the hoop body 10 during clamping fastening are effectively improved and the occurrence of a usual case of breakage during clamping is avoided In addition, the operation step of pre-clamping deforming treatment on the fastening part 122 is also omitted. In this way, production and processing flow is optimized, production efficiency is greatly increased, and production cost is also reduced. Meanwhile, the operating personnel can also much easily sleeve the hoop body 10 on the pipe fitting, the operating personnel can, by virtue of the characteristic of the elliptical shape, much easily hold and operate with a knob by an arc surface formed by a long axis 2 and the short axis 3, and it is easier for the hoop to arrive at and be fixed at an expected position through rotary propulsion. According to the present invention, on one hand, an inner circumference is increased in disguised form in a manner of the elliptical shape; on the other hand, the stress time of bulged elements is slowed and delayed by designing a gap difference between the adjacent clamping elements 13, so as to compensate the weak points.

I claim:

1. A hoop, comprising a clamping belt, wherein the clamping belt is bent to form a hoop body with an elliptical sleeving area; the hoop body forms a superposed part, and the superposed part comprises an outer belt body and an inner belt body; wherein a plurality of clamping connection notches are arranged in any one of the outer belt body and the inner belt body, and a plurality of clamping elements are correspondingly arranged on the other belt body; wherein each clamping connection notch comprises a first clamping connection port and a second clamping connection port, each clamping connection element comprises a first clamping connection element and a second clamping connection element; the first clamping connection port comprises a first locking resisting side, and the second clamping connection port comprises a second locking resisting side; and when the clamping connection elements penetrate in the clamping connection notches to form locking, a stroke from the first clamping connection element to the first locking resisting side is greater than a stroke from the second clamping connection element to the second locking resisting side.

2. The hoop according to claim 1, wherein the elliptical sleeving area is provided with a long axis and a short axis, the outer belt body is provided with a fastening part vertically to a direction of the short axis in the elliptical sleeving area, and the short axis is superposed with a central line of the fastening part.

3. The hoop according to claim 1, wherein the elliptical sleeving area is provided with a long axis and a short axis, a length range of the long axis of the hoop body is 17.2 mm+/−0.25 mm, and a length range of the short axis of the hoop body is 15.7 mm+/−0.25 mm.

4. The hoop according to claim 1, wherein a difference range of the stroke from the first clamping connection element to the first locking resisting side, and the stroke from the second clamping connection element to the second locking resisting side is 0.3 mm-0.6 mm.

5. A manufacturing method of a hoop for manufacturing a hoop of claim 1, comprising:
   producing a clamping belt; and
   directly bending the clamping belt to form a hoop body with an elliptical sleeving area; wherein a fastening part is clamped and shrunk in advance, so that a short axis in the elliptical sleeving area, and a pipe fitting have an equal outer diameter.

6. A use method of a hoop of claim 1, comprising:
   directly bending a clamping belt to form a hoop body with a sleeving area;
   carrying out pre-forming treatment on the sleeving area to enable the sleeving area to be elliptical and enable a short axis in the sleeving area and a pipe fitting to have an equal outer diameter;
   sleeving the hoop body on the pipe fitting to enable the hoop body to form abutting connection with the pipe fitting at the short axis corresponding to the sleeving area; and
   further shrinking and clamping the hoop through a hoop clamping tool.

* * * * *